United States Statutory Invention Registration [19]

[11] Reg. Number: H685

Olson et al. [43] Published: Oct. 3, 1989

[54] DEPLOYABLE FIN CONFIGURATION FOR FREE FLIGHT CONTROL OF CYLINDRICAL BODIES

[75] Inventors: Donald N. Olson, Lutherville; Miles C. Miller, Joppatown, both of Md.

[73] Assignee: The United States of America as represented by the Secretary of the Army, Washington, D.C.

[21] Appl. No.: 209,258

[22] Filed: Jun. 20, 1988

[51] Int. Cl.[4] ..... F42B 13/32

[52] U.S. Cl. ..... 244/3.29; 102/393

*Primary Examiner*—Deborah L. Kyle
*Assistant Examiner*—Michael J. Carone
*Attorney, Agent, or Firm*—Anthony T. Lane; Edward Goldberg; Michael C. Sachs

[57] ABSTRACT

This invention offers a simple, inexpensive solution to both the dispersion and orientation problems, and can also be very effective for inducing scanning of the ground in flight of a munition, for target location. A munition, such as a cylindrical body, is provided with two curved, full-length wings or fins attached longitudinally along an upper half of the cylindrical body, both directed concavely against the air flow. (An example is shown in FIG. 1). As munitions so equipped with said wings are dropped and descend through the air of their own power, several effects are achieved. First, the munitions will land right side up. Secondly, dispersal of plurality released munitions will occur and not land lumped-up in a single group for instance. Slots and tabs can be cut in opposite corners of the wings to produce a pin-wheel effect which will improve ground coverage in scanning.

2 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEPLOYABLE FIN CONFIGURATION FOR FREE FLIGHT CONTROL OF CYLINDRICAL BODIES

GOVERNMENTAL INTEREST

The invention described herein may be made, used, or licensed by or for the Government for Governmental purposes without the payment to us of any royalties thereon.

BACKGROUND AND FIELD OF THE INVENTION

Efforts to achieve dispersion of air delivered items on the ground have involved the use of parachutes, aerodynamic decelerators, autorotation, explosive ejection and other methods of imparting a lateral velocity component to the trajectory of the package after being dispensed. However, there are a large number of dispensers currently in use that only eject their packages downward. Method employed to achieve dispersion and prevent concentrations of the items into tight groups on the ground usually involve complex and expensive mechanisms that often have poor reliability.

An additional problem is that of landing an air delivered item in a safe or particular upward position. Cylindrically shaped bodies for example, are commonly employed in air delivered ordinance related items such as submunitions, mines, sensors, etc. It is often desired to have these items possess a preferred flight attitude, stable flight motion and a reduced terminal velocity. For example, if a cylindricaly shaped air delivered mine would fly in essentially a broadside attitude, without rotating about its longitudinal axis, it would always impact the ground on the same side of the mine body. This side of the mine could then be especially structurally reinforced more than the other sides to absorb the ground impact forces; the opposite side of the mine body could be considerably weaker. The combination of the broadside flight attitude and good flight stability would minimize oscillatory motion and would result in the mine coming to rest after ground impact with the relatively weaker side of the mine in an upward orientation. This will allow the warhead to function more effectively in an upward direction. A low terminal velocity will insure the mine structurally surviving ground impact and eliminating bouncing which could affect the final resting attitude.

In another area of concern, aerodynamic design is sought for falling and gliding munitions, which would enable the munition to scan the ground area by rotation of the munition as it descends, for detection of enemy targets on the ground. It is desired that a sensor on the munition be oriented to point towards the ground and not skyward, for such application. It is also desired for the sensor to rotate at an angle to the munition's vertical axis in flight, in order to scan the ground in ever-decreasing circles, as the munition rotates during descent thereby covering most of the ground area.

BRIEF DESCRIPTION OF THE INVENTION

This invention offers a simple, inexpensive solution to both the dispersion and orientation problems, and can also be very effective for inducing scanning of the ground in flight of a munition, for target location. A munition, such as a cylindrical body, is provided with two curved, full-length wings or fins attached longitudinally along an upper half of the cylindrical body, both directed concavely against the air flow. (An example is shown in FIG. 1). As munitions so equipped with said wings are dropped and descend through the air of their own power, several effects are achieved. First, the munitions will land right side up; they will descend and also land always in the same orientation they are dropped in, (as shown in FIG. 1). This can be important for certain mines which must avoid damage and also land properly oriented. Secondly, during flight if a plurality of such munitions are released, they will disperse very well one from the other, and not land clumped-up in a single group for instance. The scanning of the ground during descent flight, another benefit as mentioned earlier, can also be achieved with this design by cutting slots or tabs in opposite corners of the wings as shown in the Figures. This causes a pin-wheel effect where the munition spins in flight but also around a rotational axis which axis is at an angle to the direction of descent of the munition (mostly vertical towards the ground). If a sensor were mounted on the munition groundward facing, it will be able to scan out the ground area during flight in this manner (see FIG. 8); this can be used to detect targets on the ground if desired such as in the search and destroy armor applications.

OBJECTS OF THE INVENTION

Accordingly, it is an objective of this invention to provide aerodynamic means to control the descent of a small cylindrical object through the atmosphere.

Another object of this invention is to configure a fin arrangement for a cylindrical object, so that it always lands only on a particular one of its sides longitudinally, which side may be reinforced to a greater degree to withstand the impact.

A further objective of this invention is to configure a cylindrical object with fins so that it descends through the atmosphere in a spiral pattern, with only one side facing to the ground, so that it may be employed to scan the ground area for targets by equipping it with sensors aimed at the ground.

Other objects and advantages of this invention will become apparent through a reading of the within specification and a viewing of the attached drawings, in which:

LIST OF FIGURES

FIG. 2 shows the cylindrical shape of the body when the fins are folded in;

Figure 6:
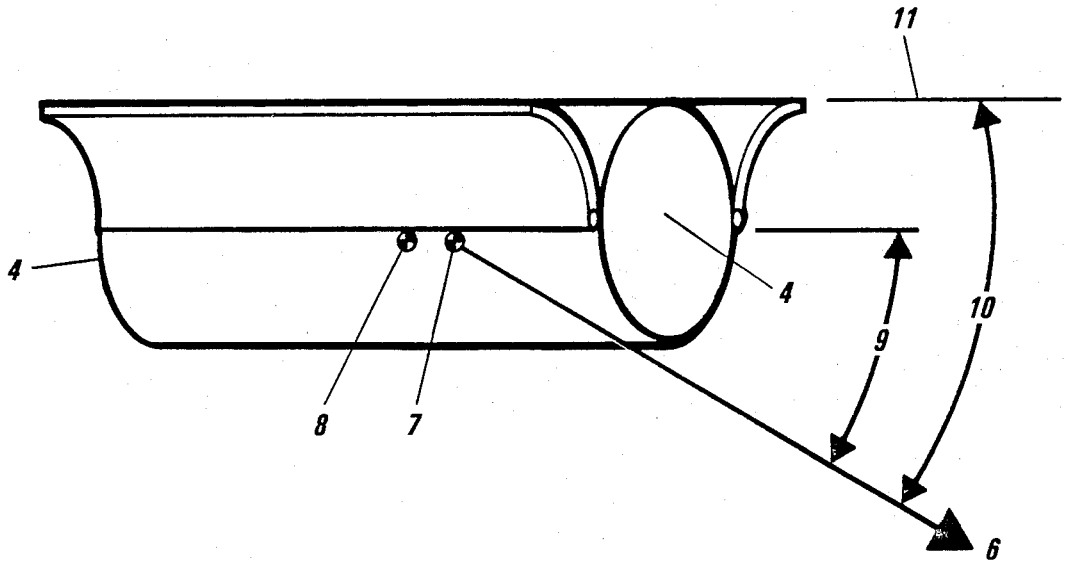
Figure 7:
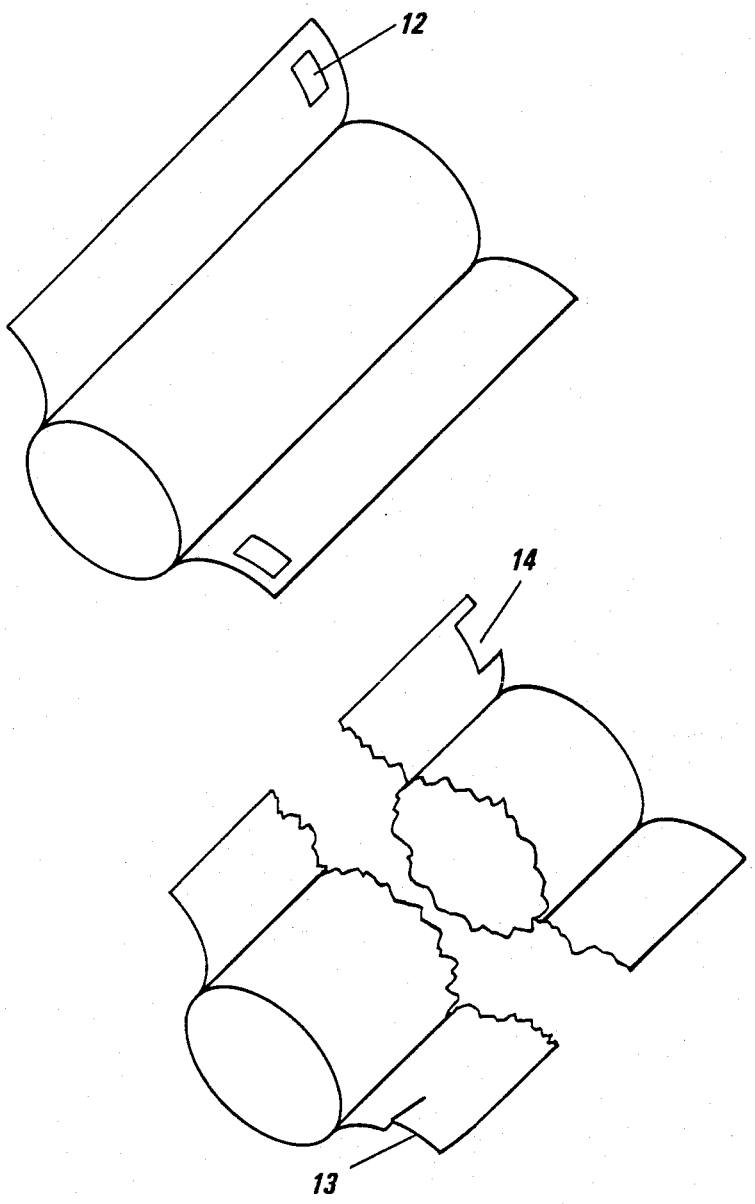
Figure 8:
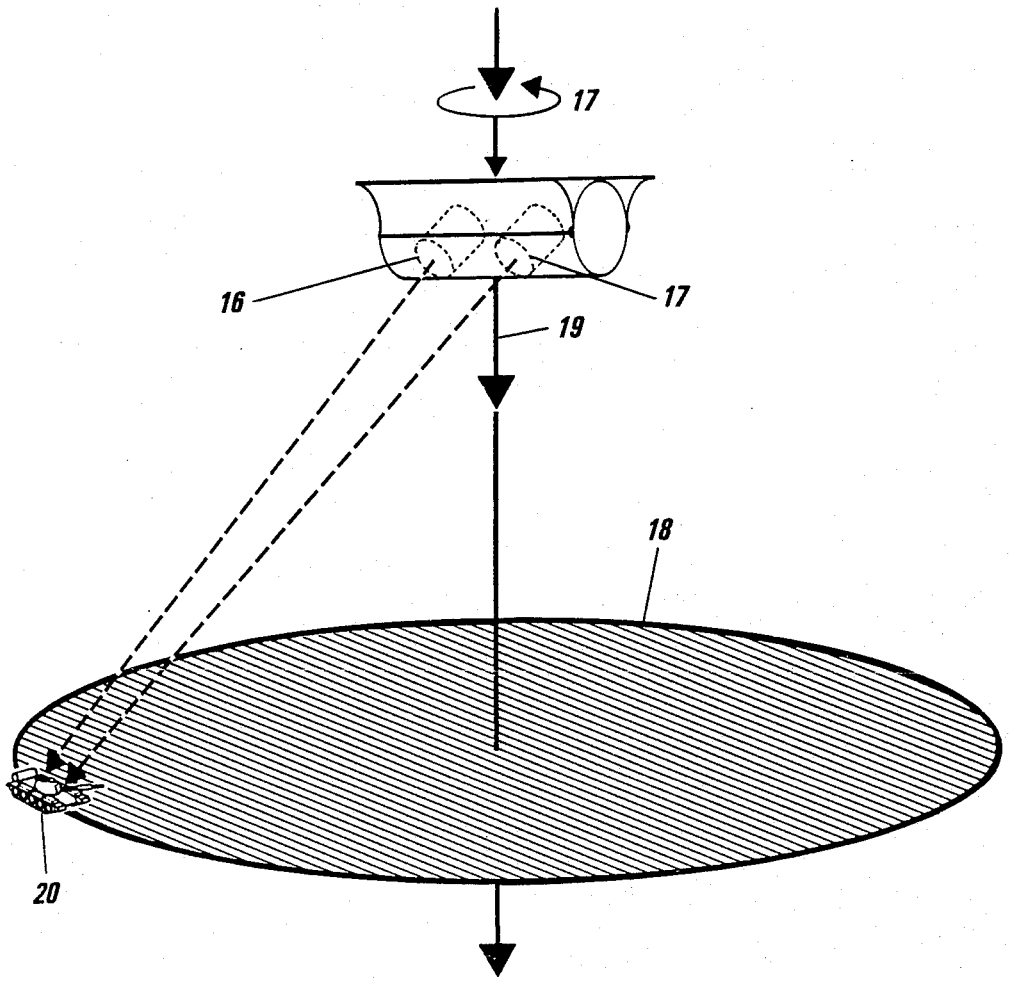

FIG. 6 serves to illustrate the angle of descent of the deployed cylindrical body;

FIG. 7 shows alternate slotted and notched fin type deployed cylindrical bodies; and FIG. 8 illustrates spinning action in descent of the deployed cylindrical body used for scanning an area in search of a target.

DETAILED DESCRIPTION OF THE INVENTION

Figure 1:
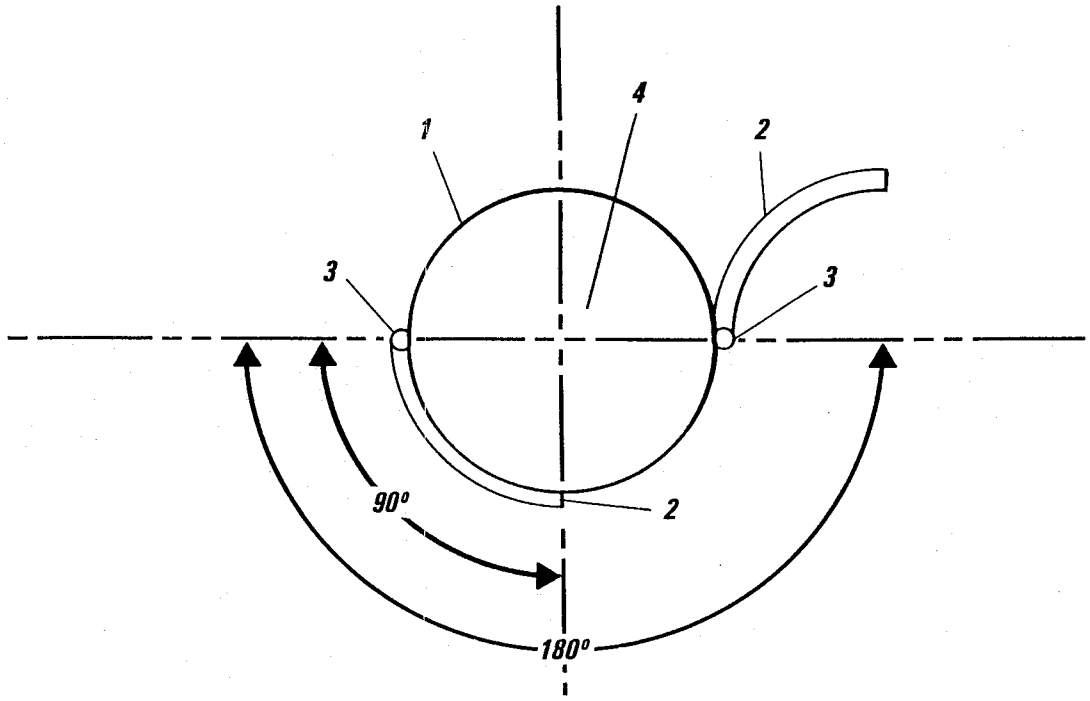
FIG. 1 shows the cylindrical body with fins deployed.

One embodiment of the invention is illustrated in FIG. 1. Basically, it comprises a cylindrical body (1) with two fins (2) curved to approximately the same radius as the body with a fin width equal to a 90 degree sector arc length, and extending down essentially the full length of the body. The fin curve is tangent to the body surface at the junction lines (3) being 180 degrees apart on the cylinder, and with ends (4). The invention produces an aerodynamic configuration which can provide a broadside flight orientation, possesses exceptional stability, and exhibits quite low terminal velocity for a cylindrically shaped body in free flight when the center of gravity of the body with fins, is maintained equidistant from the two ends of the cylindrical body. Also, by placing the center of gravity location slightly away from the center of the cylinder, a stable gliding flight can be achieved. In addition, a minor configurational alternation (adding the slots) will provide a controlled rotational motion about the body flight path which is desirable in certain applications, to be explained further below. This invention also offers a simple and inexpensive way to achieve the desired dispersion for when the center of gravity is displaced longitudinally by a small amount from the center of the cylindrical body (i.e., a point equally distant from the ends of the cylinder), the cylinder, when deployed will assume a trim angle of attack and glide with good aerodynamic stability and little motion about its pitch yaw or roll axes. The amount of center of gravity displacement affects the lift to drag ratio, so the resultant gliding flight path angle of the finned cylinder, and the degree of dispersion can be selectively controlled. The result is that munitions, or other cylindrical packages, can be delivered to the ground in a relatively controlled manner to form a specific shape and size of pattern on the ground, with use of our invention.

Figure 2:
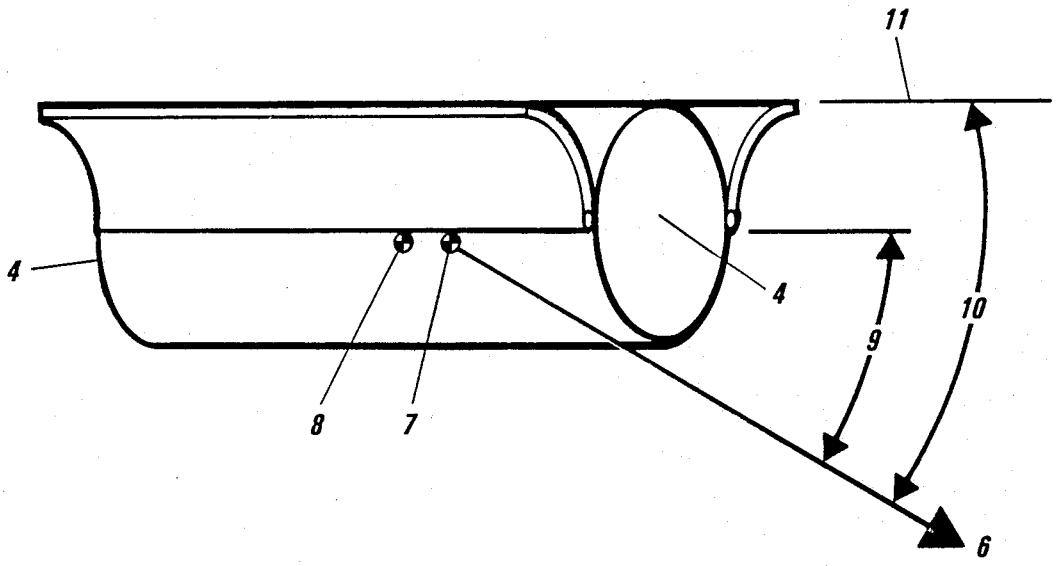
Figure 3:
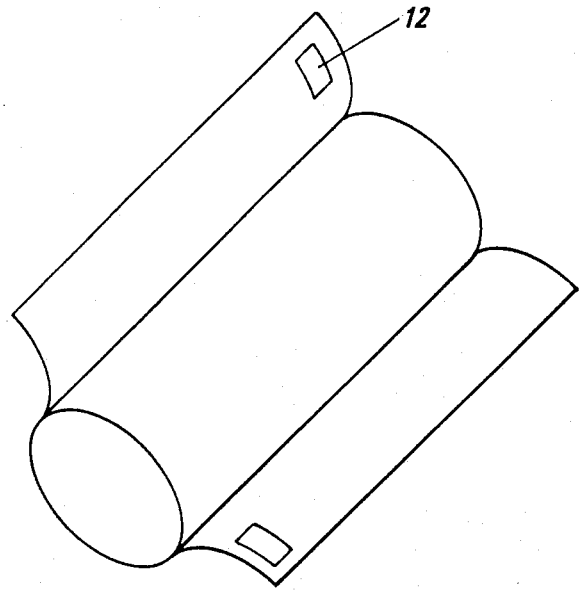
FIG. 3 shows the cylindrical body on an end view when a fin is deployed.
Figure 4:
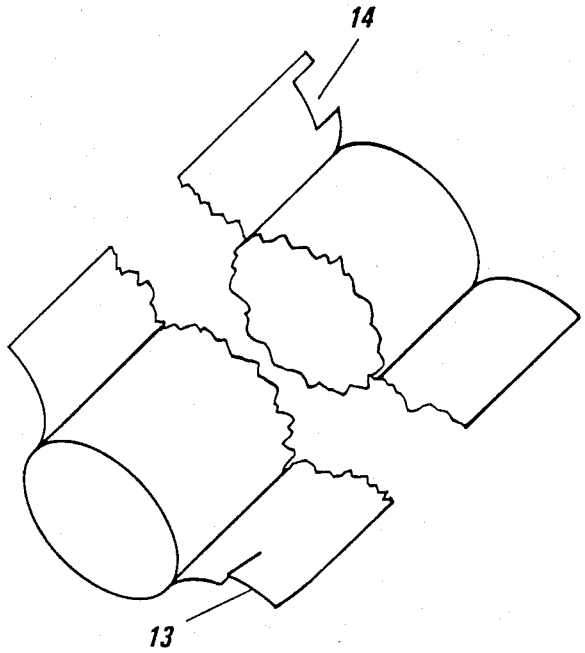
FIG. 4 illustrates the direction of fall of the cylindrical body with deployed fins.
Figure 5:
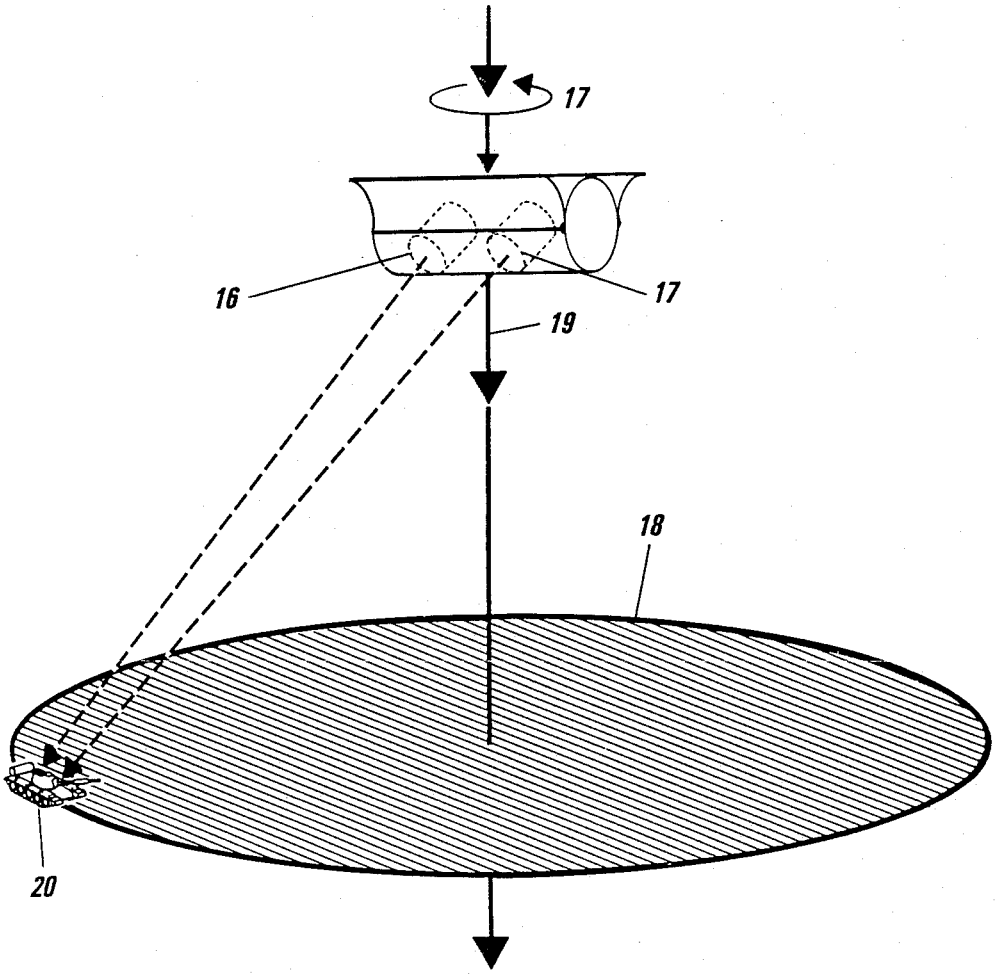
FIG. 5 illustrates the use of a plurality of the deployed cylindrical bodies for scanning an area, possibly in search of a target.

FIG. 2 shows the cylindrical body, with the fins (2) folded, so that it can be stowed in a downward ejecting dispenser such as a type that is currently used to air deliver cylindrical munitions of approximately the proportions in the illustration. FIG. 3 shows an end view of the cylindrical body with one fin deployed and one fin stowed to illustrate the configurational details of this arrangement. This configuration can be made to fly in a broadside attitude (i.e., with the longitudinal axis of the cylindrical surface in the direction of flight (6) with the fins having their concave surface facing in the direction of flight as illustrated in FIG. 4. In this case the center of gravity should be equidistant from each end of the cylindrical body. The configuration possesses exceptional flight stability with a virtual absence of oscillatory motion between the body and the direction of flight. FIG. 5 shoes cylindrical mines having the subject invention deployable fin configuration being air delivered using a downward ejecting dispenser mounted on a helicopter. After downward ejection, the fins of the mines deploy, causing each mine to fly in a stable broadside flight attitude. The off-set center of gravity in certain of the mines would cause them to glide in flight resulting in lateral flight of these mines producing a well distributed pattern of mines on the ground which is an important objective. FIG. 6 illustrates gliding flight with center of gravity off-set. Here the center of gravity (7) is off-set from a point (8) that is equidistant between ends (4) of the cylindrical body. The center of gravity causes the cylinder with fins deployed to fly at an angle of attack (9) with respect to the direction of flight (6). The direction of flight (6) has an angle (10) with respect to the horizontal (11) which is determined by the aerodynamic lift to drag ratio at trim angle of attack. This configuration flies at an angle of attack that is nearly the same as the flight path angle so that the fins remain essentially level in gliding flight. An additional performance capability can be achieved with this invention by the addition of slots (12), tabs (13), or cut-outs (14) in opposite corners of the fins as illustrated in FIG. 7. These alterations cause the item to rotate at a controlled rate about the direction of flight. This rotation, in combination with the inherent stability of the item in pitch and roll, will allow the item to include a target detector (15) and directed warhead (16) as illustrated in FIG. 8. The controlled rotation (17) would allow the target detector to scan an ever decreasing circular ground area (18) below as the item flies toward the ground (19). Upon detecting a target (20) the warhead is fired toward the target. The inherent flight characteristics of the invention provide an exceptional controlled and repeatable operational performance not possible with other known methods.

While the invention may have been described with respect to one particular embodiment or embodiments, the invention also includes all substitutions and modifications within the spirit and scope of the invention, as will occur to those skilled in the art.

What is claimed is:

1. A deployable fin configuration for free flight control of an elongated cylindrical body comprising:

two fins, longitudinally attached on opposite sides of the said cylindrical body and along the whole length of the said cylindrical body, said fins angularly positioned on the same side of said cylindrical body and curved in a 90 degree arc concave against airflow, whereby, when said cylindrical body descends in flight it always lands on the side of said body opposite said fins.

2. The fin configuration of claim 1 wherein said fins are hinged at place of attachment to said body, and although normally closed against the cylindrical body the fins open on said hinges in flight due to air flow.

* * * * *